(12) United States Patent
Malik et al.

(10) Patent No.: US 11,747,992 B2
(45) Date of Patent: Sep. 5, 2023

(54) MEMORY WEAR MANAGEMENT

(71) Applicant: Micron Technology, Inc., Boise, ID (US)

(72) Inventors: Saira Samar Malik, Lafayette, IN (US); Hyunyoo Lee, Boise, ID (US); Chinnakrishnan Ballapuram, San Jose, CA (US); Taeksang Song, San Jose, CA (US); Kang-Yong Kim, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/349,634

(22) Filed: Jun. 16, 2021

(65) Prior Publication Data

US 2022/0011944 A1 Jan. 13, 2022

Related U.S. Application Data

(60) Provisional application No. 63/050,283, filed on Jul. 10, 2020.

(51) Int. Cl.
*G06F 3/06* (2006.01)
*G06F 12/02* (2006.01)

(52) U.S. Cl.
CPC .......... *G06F 3/0619* (2013.01); *G06F 3/0656* (2013.01); *G06F 3/0659* (2013.01); *G06F 3/0679* (2013.01); *G06F 12/0246* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 10,606,743 B2 * | 3/2020 | Rehmeyer | G11C 7/24 |
| 2003/0169630 A1 * | 9/2003 | Hosono | G11C 16/105 365/200 |
| 2013/0185475 A1 * | 7/2013 | Talagala | G06F 12/0866 711/102 |
| 2013/0185508 A1 * | 7/2013 | Talagala | G06F 12/0888 711/E12.052 |
| 2019/0369881 A1 * | 12/2019 | Porter | G11C 16/349 |
| 2020/0251154 A1 * | 8/2020 | Porter | G11C 7/1036 |

* cited by examiner

*Primary Examiner* — Kevin Verbrugge
(74) *Attorney, Agent, or Firm* — Holland & Hart LLP

(57) ABSTRACT

Methods, systems, and devices for memory wear management are described. A device may include an interface controller and a non-volatile memory. The interface controller may manage wear-leveling procedures for memory banks in the non-volatile memory. For example, the interface controller may select a row in a memory bank for the wear-leveling procedure. The interface controller may store data from the row in a buffer in the interface controller. The interface controller may then transfer the data to the non-volatile memory so that the non-volatile memory can write the data to a second row of the memory bank.

23 Claims, 8 Drawing Sheets

MEMORY WEAR MANAGEMENT

CROSS REFERENCE

The present Application for Patent claims the benefit of U.S. Provisional Patent Application No. 63/050,283 by MALIK et al., entitled "MEMORY WEAR MANAGEMENT," filed Jul. 10, 2020, assigned to the assignee hereof, and expressly incorporated by reference herein.

BACKGROUND

The following relates generally to one or more memory systems and more specifically to memory wear management in a system.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may include a main memory (e.g., a primary memory for storing information among other operations) and a secondary memory that may operate as a cache. Such a configuration may allow the device to benefit from advantages of non-volatile memory (e.g., non-volatility, high storage capacity, low power consumption) while maintaining compatibility with a host device. However, repeatedly accessing memory cells in the non-volatile memory may wear down the non-volatile memory cells and decrease the endurance of the non-volatile memory cells (e.g., by modifying various characteristics of memory cells in a manner that impairs functionality). To preserve the endurance of the non-volatile memory, a device may perform wear-leveling procedures that move data between various locations, such as rows of a bank, in the non-volatile memory, which may prevent the memory cells at a given address from being excessively accessed. But during a wear-leveling procedure for a row other rows in the bank may not be accessible, which may delay satisfying data requests for the bank from a host device.

According to the techniques described herein, a device may continue to service data requests for a bank during a wear-leveling procedure by managing the wear-leveling procedure at an interface controller, which may allow the device to access rows in the bank other than the row undergoing the wear-leveling procedure. For example, the interface controller may implement the wear-leveling procedure in two phases: a read phase and a write phase. During the read phase, the data in a first row of a bank may be read and temporarily stored in a buffer of the interface controller; and during the write phase, the data may be transferred from the buffer to the non-volatile memory and stored in a second row of the bank. Because the read and write phases may be separable (e.g., capable of being performed non-contiguously), the rows involved in the wear-leveling procedure can be closed in between the read and write phases so that one or more other rows in the bank can be accessed. This means the device can service data requests for the bank during the wear-leveling procedure, which may increase system performance, among other benefits.

Features of the disclosure are initially described in the context of a memory system and subsystem as described with reference to FIGS. 1 and 2. Features of the disclosure are described in the context of a device, as described with reference to FIG. 3, a process flow, as described with reference to FIG. 4, and a timing diagram, as described with reference to FIG. 5. These and other features of the disclosure are further illustrated by and described with reference to an apparatus diagram and flowcharts that relate to memory wear management as described with reference to FIGS. 6-8.

Figure 1:
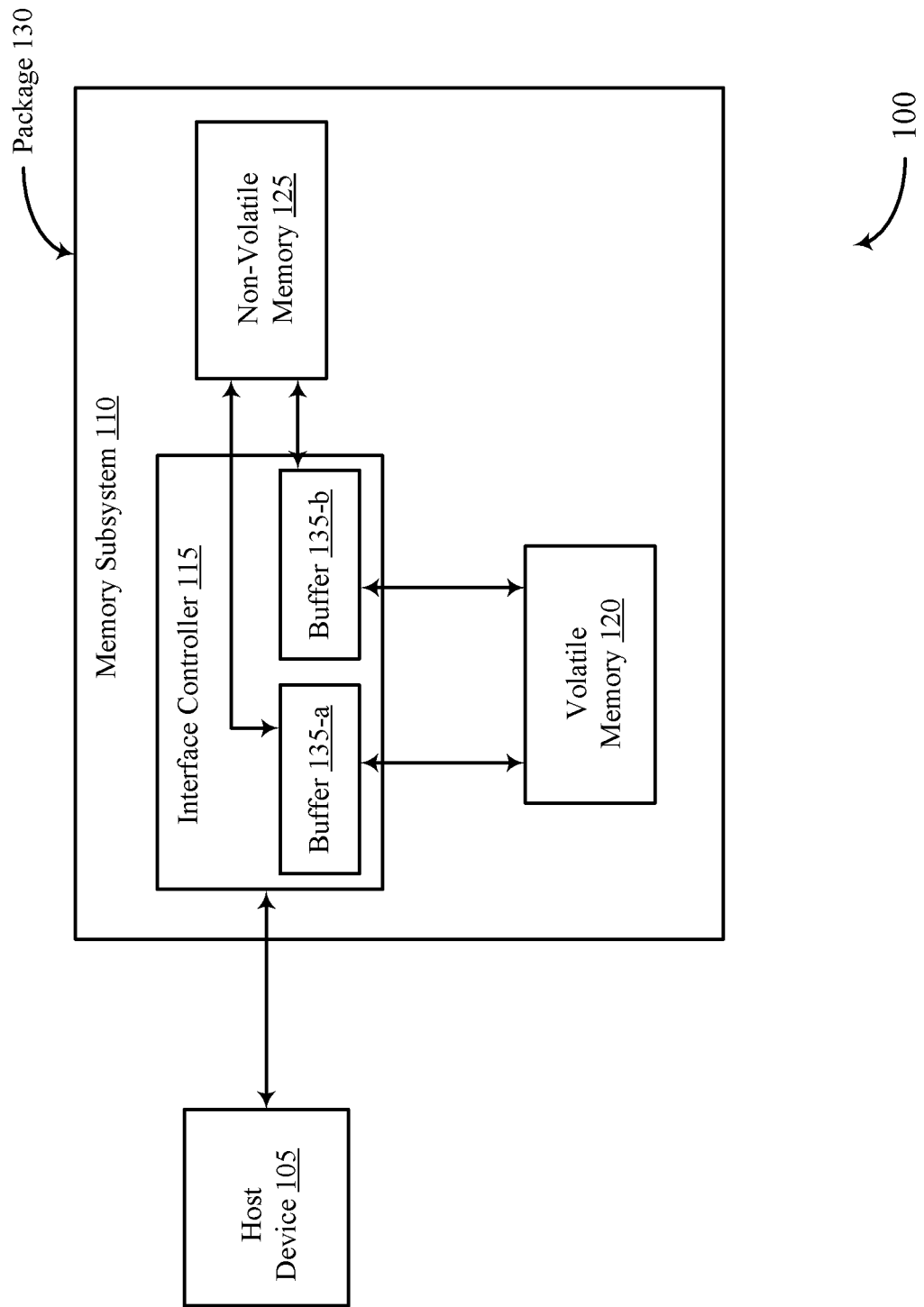
FIG. 1 illustrates an example of a system that supports memory wear management in accordance with examples as disclosed herein.

FIG. 1 illustrates an example of a memory system 100 that supports cache management in a memory subsystem in accordance with examples as disclosed herein. The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64B) or 128 bytes (128B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120.

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data) so that it can be transmitted to the host device 105. The term "hit" may be used to refer to the scenario where the volatile memory 120 stores data requested by the host device 105. If then sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that the n sets of volatile memory cells do not store the requested data) so that it can be transmitted to the host device 105. The term "miss" may be used to refer to the scenario where the volatile memory 120 does not store data requested by the host device 105.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-*b* so that it can be transferred to the non-volatile memory 125 for storage. Such a process may be referred to as "eviction" and the data transferred from the volatile memory 120 to the buffer 135-*b* may be referred to as "victim" data. In some cases, the interface controller 115 may transfer a subset of the victim data from the buffer 135-*b* to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

In some examples, the memory subsystem 110 may perform wear-leveling procedures on the non-volatile memory 125 to preserve the endurance of the non-volatile memory 125, among other benefits. The wear-leveling procedures may shift data along rows of the non-volatile memory so that repeated requests for the data (e.g., row hammer (RH) attacks) do not result in repeated access of the same memory cells, which can wear down the non-volatile memory cells and decrease their reliability. In some examples, the memory interface controller 115 may initiate a wear-leveling procedure by sending a memory management (MM) command to the non-volatile memory 125. The memory management command may cause the non-volatile memory 125 to move data from a first row of a memory bank in the non-volatile memory 125 to a second row of the memory bank. But during this time other rows of the memory bank may be inaccessible, which means that functional commands for data (e.g., those with origins at the host device 105) cannot be serviced until the wear-leveling procedure is completed. Thus, the latency of the system 100 may be increased, which may negatively impact the performance of the system 100.

According to the techniques described herein, the interface controller 115 may manage a wear-leveling procedure for a memory bank so that functional commands for data in the memory bank can be serviced during the wear-leveling procedure. The interface controller 115 may effectuate a wear-leveling procedure for a memory bank by performing the wear-leveling procedure in multiple phases, which may allow the non-volatile memory 125 to service functional commands for data in between the phases. For example, the interface controller 115 may complete a read phase of the wear-leveling procedure, service a quantity of one or more functional commands for data, then complete a write phase for the wear-leveling procedure. Thus, the latency of the system 100 may be decreased by servicing data requests during a wear-leveling procedure, which may improve the performance of the system 100.

Figure 2:
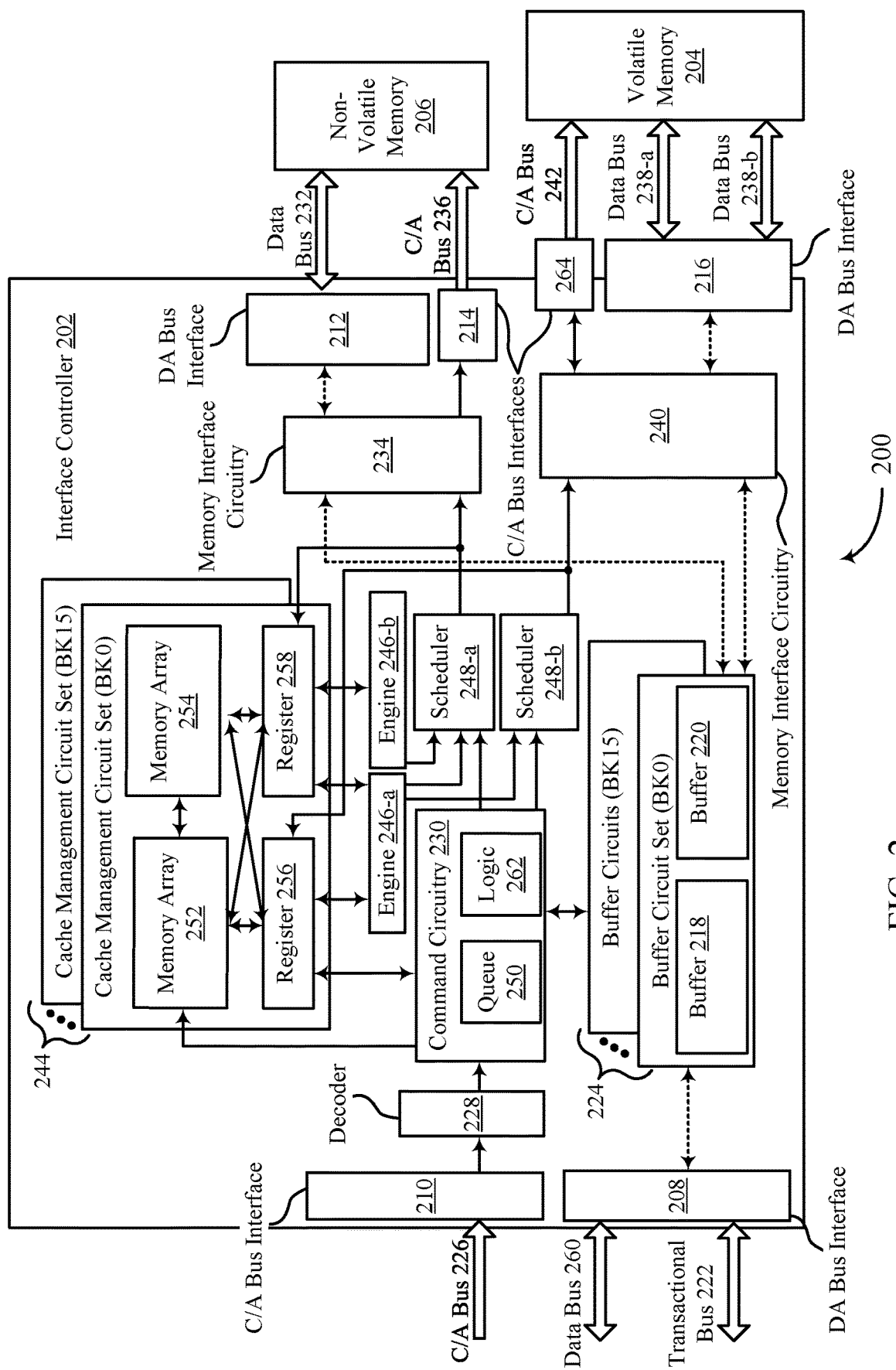
FIG. 2 illustrates an example of a memory subsystem that supports memory wear management in accordance with examples as disclosed herein.

FIG. 2 illustrates an example of a memory subsystem 200 that supports cache management in a memory subsystem in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces. In some cases, different memory device types may have different page sizes. For example, a DRAM page size (e.g., 2 kB) may be a superset of a non-volatile memory (e.g., FeRAM) page size (e.g., 64B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row. As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as SRAM cells.

Storage information may include content information, validity information, or dirty information (or any combination thereof) associated with the volatile memory 204. Content information (which may also be referred to as tag information or address information) may indicate which data is stored in a set of volatile memory cells. For example, the content information (e.g., a tag address) for a set of one or more volatile memory cells may indicate which set of one or more non-volatile memory cells currently has data stored in the set of one or more volatile memory cells. Validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., content and validity information) for an associated bank (e.g., BK0) of the volatile memory 204. The storage information may be stored on a per-page basis (e.g., there may be respective storage information for each page of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set of volatile memory cells when actual data is stored in that set of volatile memory cells. This bit may be referred to a validity bit or a validity flag. As with the content information, the validity information stored in the memory array 252 may be stored on a per-page basis. Thus, each validity bit may indicate the validity of data stored in an associated page in some examples.

The memory array 254 may be similar to the memory array 252 and may also include memory cells that store validity information for a bank (e.g., BK0) of the volatile memory 204 that is associated with the memory array 252. However, the validity information stored in the memory array 254 may be stored on a sub-block basis as opposed to a per-page basis for the memory array 252. For example, the validity information stored in the memory cells of the memory array 254 may indicate the validity of data for subsets of volatile memory cells in a set (e.g., page) of volatile memory cells. As an example, the validity information in the memory array 254 may indicate the validity of each subset (e.g., 64B) of data in a page of data stored in BK0 of the volatile memory 204. Storing content information and validity information on a per-page basis in the memory array 252 may allow the interface controller 202 to quickly and efficiently determine whether there is a hit or miss for data in the volatile memory 204. Storing validity information on a sub-block basis may allow the interface controller 202 to determine which subsets of data to preserve in the non-volatile memory 206 during an eviction process.

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-b or both. The cache management circuitry set may also include a second register (e.g., a register 258 which may be a victim page tag (VPT) register) configured to receive storage information from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on content information from the register 256.

The engine 246-a may be coupled with the register 256, the register 258, and the schedulers 248. The engine 246-a may be configured to receive storage information from various components and issue commands to the schedulers 248 based on the storage information. For example, when the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, when the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204. In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., pages) of volatile memory cells associated with the memory address are empty (e.g., store random or invalid data). In some cases, a set of volatile memory cells in the volatile memory 204 may be referred to as a line or cache line.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the old data (e.g., existing data) in one of the n associated sets of volatile memory cells to the buffer 220. The dirty information for the old data may also be transferred to the memory array 254 or register 258 for identification of dirty subsets of the old data. After the old data is stored in the buffer 220, the new data can be transferred from the buffer 218 to the volatile memory 204 and the old data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-b based on dirty information transferred (e.g., from the volatile memory 204) to the memory array 254 or register 258 during the eviction process.

In another example, the interface controller 202 may receive a retrieval command from the host device. The retrieval command may be received over the C/A bus 225 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells are available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

In some examples, the memory subsystem 200 may implement wear-leveling procedures to mitigate harmful effects that arise from repeatedly accessing non-volatile memory cells in the non-volatile memory array 206. The wear-leveling procedures may move data between rows of a memory bank so that repeated requests for data do not result in the same row getting repeatedly accessed. For example, a wear-leveling procedure may move data from one row in memory bank to another row of the memory bank. By continuing to perform wear-leveling procedures over time, the data in a memory bank may be continually shuffled between rows, which may reduce the likelihood of rows being excessively accessed.

To implement a wear-leveling procedure for a bank in the non-volatile memory 206, the interface controller 202 may issue a memory management command to the non-volatile memory 206. The non-volatile memory 206 may respond to the memory management command by performing a read operation on a first row of the bank and performing a write operation on a second row of the bank. The read and write operations may be performed back-to-back (e.g., consecutively, uninterrupted by other access operations for the bank) to reduce the complexity of managing the wear-leveling procedure at the non-volatile memory 206. However, performing the read and write operations back-to-back may mean that the memory back is effectively inaccessible for the duration of the wear-leveling procedure (e.g., ~400 ns). This is because only one row in a bank can be activated at a time, and back-to-back read and write operations leave no time to activate rows uninvolved in the wear-leveling procedure. Thus, any commands for data in the bank that arrive during the wear-leveling procedure cannot be serviced until the procedure is overusing these other techniques.

According to the techniques described herein, wear-leveling procedures may be managed by the interface controller 202, as opposed to other components of the memory subsystem, such as the non-volatile memory 206. For example, the interface controller 202 may control when the non-volatile memory 206 performs the read operation and the write operation of a wear-leveling procedure for a memory bank. By separating these operations in time, the interface controller 202 may reduce the consecutive amount of time the memory bank is inaccessible (e.g., from ~400 ns to ~160 ns) and provide a window during which functional commands for the memory bank can be serviced. Thus, the latency of satisfying functional commands may be reduced, which may improve the performance of the memory subsystem 200.

As described herein, satisfying a command may refer to completing the request associated with the command (e.g., storing provided data, returning requested data), whereas servicing a command may refer to performing one or more operations to satisfy the command. The distinction between servicing a command and satisfying a command may be relative to the origin and termination of the command.

Figure 3:
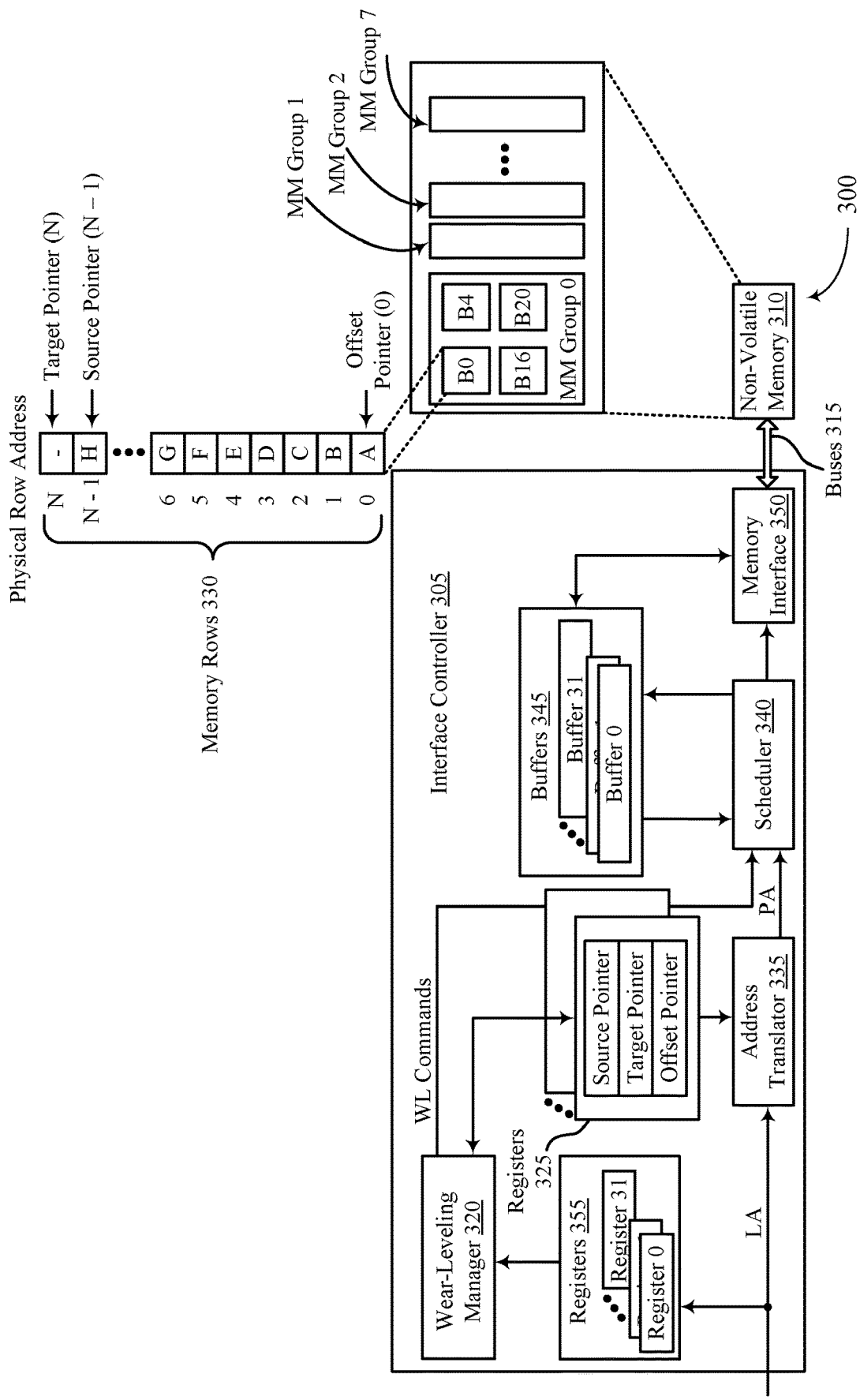
FIG. 3 illustrates an example of a device that supports memory wear management in accordance with examples as disclosed herein.

FIG. 3 illustrates an example of a device 300 that supports memory wear management in accordance with examples as disclosed herein. The device 300 may include aspects of the memory subsystem 110, as described with reference to FIG. 1, or the memory subsystem 200, as described with reference to FIG. 2. The device 300 may include an interface controller 305 and a non-volatile memory 310, which may be coupled with each other via one or more buses 315 (e.g., data buses, C/A buses, transactional buses). Although not shown, the device 300 may include a volatile memory that operates as a cache. As described herein, the interface controller 305 may manage wear-leveling procedures for the non-volatile memory 310 so that memory banks undergoing a wear-leveling procedure can still be accessed during the procedure to service functional data requests.

The non-volatile memory 310 may include multiple memory banks each of which may include multiple memory rows (e.g., memory rows 330). For example, the non-volatile memory 310 may include thirty-two memory banks denoted B0 through B32, each of which may include memory rows 1 through N. The memory rows within a memory bank may be differentiated by physical row addresses, which may identify the memory cells of a corresponding word line. The memory banks may be logically or physically grouped into memory management groups. For example, the memory banks may be divided into eight memory management groups denoted MM group 0 through MM group 7. As described in greater detail herein, a wear-leveling procedure may be implemented on a per-bank basis (e.g., on one bank at a time) or on a per-memory management group basis (e.g., on multiple banks in parallel). The non-volatile memory 310 may include one or more local controllers for processing and executing commands and additional circuitry for accessing memory cells and moving data.

A memory wear-leveling procedure may involve moving data from a first row of a memory bank to a second row of the memory bank. To accomplish this without overwriting stored data, each memory bank may have one or more rows that are empty (e.g., store random or redundant data) at any given time. When it is time for a wear-leveling procedure, a first memory row (e.g., row N−1) may be selected for the wear-leveling procedure. The first memory row ("source memory row") may be selected based on a source pointer, which may be a collection of bits that indicate which memory row in the memory bank is next to undergo a wear-leveling procedure. Additionally, a second memory row in the memory bank (e.g., an empty row, such as row N) may be selected for storing the data from the first memory row. The second memory row ("target memory row") may be selected based on a target pointer, which may be a collection of bits that indicate which memory row in the memory bank is to store data from the source row. In some examples, the source pointer indicates the physical row address associated with the source row and the target pointer indicates the physical row address associated with the target row.

After completing a wear-leveling procedure, the source pointer may be modified (e.g., decremented) to point to the next source memory row (e.g., row six) and the target pointer may be modified (e.g., decremented) to point to the next target memory row (e.g., row N−1) (unless either pointer indicates the last row (e.g., row 0), in which case the pointer may wrap around to row N). Thus, the target pointer and source pointer may be used to manage wear-leveling procedures.

In addition to the target pointer and source pointer, which enable wear-leveling procedures, the interface controller 305 may use an offset pointer that enables address translation (e.g., conversion of logical row addresses into physical row addresses). A logical row address may be a virtual address generated by the host device and used to reference a row where data is expected to be stored, whereas a physical row address may be an actual address that identifies a physical row where data is actually stored. Logical addresses may be used by a host device so that the effects of wear-leveling procedures are effectively hidden from the host device, among other reasons. However, because the non-volatile memory 310 operates on physical addresses, logical addresses may be mapped to physical addresses to facilitate communications between the host device and the non-volatile memory 310. For example, a logical address may be mapped to a physical address based on the offset pointer, which may be a collection of bits that indicate the offset (e.g., difference) between the logical row address and the physical row address. Such mapping may be referred to herein as translation or conversion.

As shown in the example in FIG. 3, the offset pointer may initially be zero (0) because the logical address for data A is the same as the physical address for data A (and so on and so forth for the other data). However, after the data in rows 0 through N has been collectively shifted up a row (e.g., after eight wear-leveling (WL) procedures), the offset pointer may be updated to one (1) to indicate that the offset between a logical address and a physical address is one. Similarly, the source pointer may be updated to indicate row N and the target pointer may be updated to indicate row 0.

To manage and facilitate wear-leveling procedures as described herein, the interface controller 305 may include logic components, registers, buffers, queues, and other circuitry.

For example, the interface controller 305 may include the wear-leveling manager 320, which may be a logic component that is responsible for managing wear-leveling procedures for the non-volatile memory 310. The wear-leveling manager 320 may manage the pointers for wear-leveling that are stored in the registers 325 and determine when to initiate a wear-leveling procedure for a memory bank (or a memory management group). The wear-leveling manager 320 may also issue wear-leveling commands (WL commands) that initiate different phases of wear-leveling procedures. For example, the wear-leveling manager 320 may issue a WL read command that initiates a read phase of a wear-leveling procedure and may issue a WL write command that initiates a write phase of the wear-leveling procedure. A wear-leveling command may be a command that is used to facilitate a wear-leveling procedure, and thus may be differentiated from a functional command which is used to facilitate non-wear-leveling procedures (e.g., data storage for a host device, data retrieval for a host device).

The interface controller 305 may also include the registers 325, which may be coupled with the wear-leveling manager 320 and the address translator 335, among other components. The registers 325 may include one or more registers that store pointers for wear-leveling procedures and address translation procedures. For example, the registers 325 may store one or more source pointers and/or one or more target pointers that facilitate wear-leveling procedures and one or more offset pointers that facilitate address transmission procedures. The pointers may be stored in respective registers or in the same register. Pointers and information related to pointers may be exchanged between the registers 325, the wear-leveling manager 320, and the address translator 335.

In some examples, the registers 325 may store pointers on a per-bank basis, which may enable per-bank wear-leveling. For example, each memory bank may have a respective target pointer, source pointer, and offset pointer stored in a register corresponding to that memory bank. Thus, different pointers may apply to different memory banks. In another example, the registers 325 may store pointers on per-MM group basis, which may enable per-MM group wear-leveling. For example, each MM group may have a respective target pointer, source pointer and offset pointer stored in a register corresponding to that MM group. Thus, different pointers may apply to different MM groups. In yet other examples, the registers 325 may store a single target pointer, source pointer, and offset pointer, which may apply to all the memory banks in the non-volatile memory.

The interface controller 305 may also include the address translator 335, which may be a logic component coupled with a host device, the registers 325, and the scheduler 340, among other components. The address translator 335 may translate logical addresses (LA) into physical addresses (PA). For example, the address translator 335 may translate a logical address received from the host device into a physical address based on an offset pointer from the registers 325. Logical addresses, physical address, pointers, and other information associated with address translation may be exchanged between the address translator 335 and other components of the interface controller 305.

The interface controller 305 may also include the scheduler 340, which may be a logic component coupled with the address translator 335, the wear-leveling manager 320, the buffers 345, and the memory interface 350, among other components. The scheduler 340 may receive functional commands from the host device (with logical addresses translated into physical addresses by the address translator 335) and wear-leveling commands from the wear-leveling manager 320 (with physical addresses). The scheduler 340 may order, queue, and schedule functional commands and wear-leveling commands and convert them into commands understood (e.g., supported) by the memory interface 350. The scheduler 340 may also detect when a functional command is associated with data involved in a wear-leveling procedure. In such cases, the scheduler 340 may cause the interface controller 305 to satisfy the functional command using the buffers 345, as opposed to using the non-volatile memory 310. In some examples, the scheduler 340 is an example of the scheduler 248-*a* as described with reference to FIG. 2.

The interface controller 305 may also include the memory interface 350, which may be a logic component coupled with the scheduler 340, the buffers 345, and the non-volatile memory 310, among other components. The memory interface 350 may receive commands (e.g., functional commands, wear-leveling commands) from the scheduler 340 and process the commands for transmission over the buses 315 to the non-volatile memory 310. The memory interface 350 may also receive data (e.g., data to be stored in the non-volatile memory 310) from the scheduler 340 or a buffer (such as the buffer 218) and relay the data to the non-volatile memory 310. Similarly, the memory interface 350 may receive data (e.g., requested data) from the non-volatile memory 310 and relay the data to the scheduler 340, a buffer (such as the buffer 218), or the buffers 345. In some examples, the memory interface 350 is an example of memory interface circuitry 234 as described with reference to FIG. 2.

The interface controller 305 may also include the buffers 345, which may be buffers, arrays, or registers that are coupled with the scheduler 340 and the memory interface 350, among other components. The buffers 345 may store data involved in wear-leveling procedures ("wear-leveling data"). In some examples, the buffers 345 may include one buffer for each memory bank in the non-volatile memory 310, and each buffer may store wear-leveling data for the memory bank to which it corresponds. For example, buffer 0 may store the data from a source memory row of bank 0 until the data is ready to be stored in a target row of bank 0. Accordingly, the buffers 345 may receive wear-leveling data from the memory interface 350 (e.g., as part of the read-phase of the wear-leveling procedure) and transmit wear-leveling data to the memory interface 350 (e.g., as part of the write-phase of the wear-leveling procedure). In some examples (e.g., when a functional command is associated with wear-leveling data, the source memory row, or the target memory row), the buffers 345 may also exchange data with the scheduler 340.

The interface controller 305 may also include the registers 355, which may be coupled with the wear-leveling manager 320 and the host device, among other components. The registers 355 may include one register for each memory bank in the non-volatile memory 310, and each register may store activity information for the memory bank to which it corresponds. For example, register 0 may store activity information for memory bank 0, register 1 may store activity information for memory bank 1, and so on and so forth. Activity information may refer to information that indicates the activity level of a memory bank, which may include a quantity of times the memory bank has been activated. For example, register 0 may maintain a counter that increments each time an activate command is received for memory bank 0.

Activity information may be transferred from the registers 355 to the wear-leveling manager 320 so that the wear-leveling manager 320 can determine when to initiate a wear-leveling procedure. For example, the wear-leveling manager 320 may initiate a wear-leveling procedure for a memory bank when the quantity of activate commands for the memory bank exceeds a threshold quantity.

In some examples, the wear-leveling manager 320 may additionally or alternatively be coupled with a timer so that elapsed time can serve as the basis for initiating a wear-leveling procedure (e.g., so that wear-leveling procedures can be performed periodically). For instance, the wear-leveling manager 320 may initiate a wear-leveling procedure for a memory bank when the amount of time since the most recent wear-leveling procedure for the memory bank exceeds a threshold amount of time.

Thus, the interface controller 305 may be configured to manage wear-leveling procedures for the non-volatile memory 310. Aspects of a wear-leveling procedure managed by the interface controller 305 are described in greater detail herein and with reference to FIG. 4.

Figure 4:
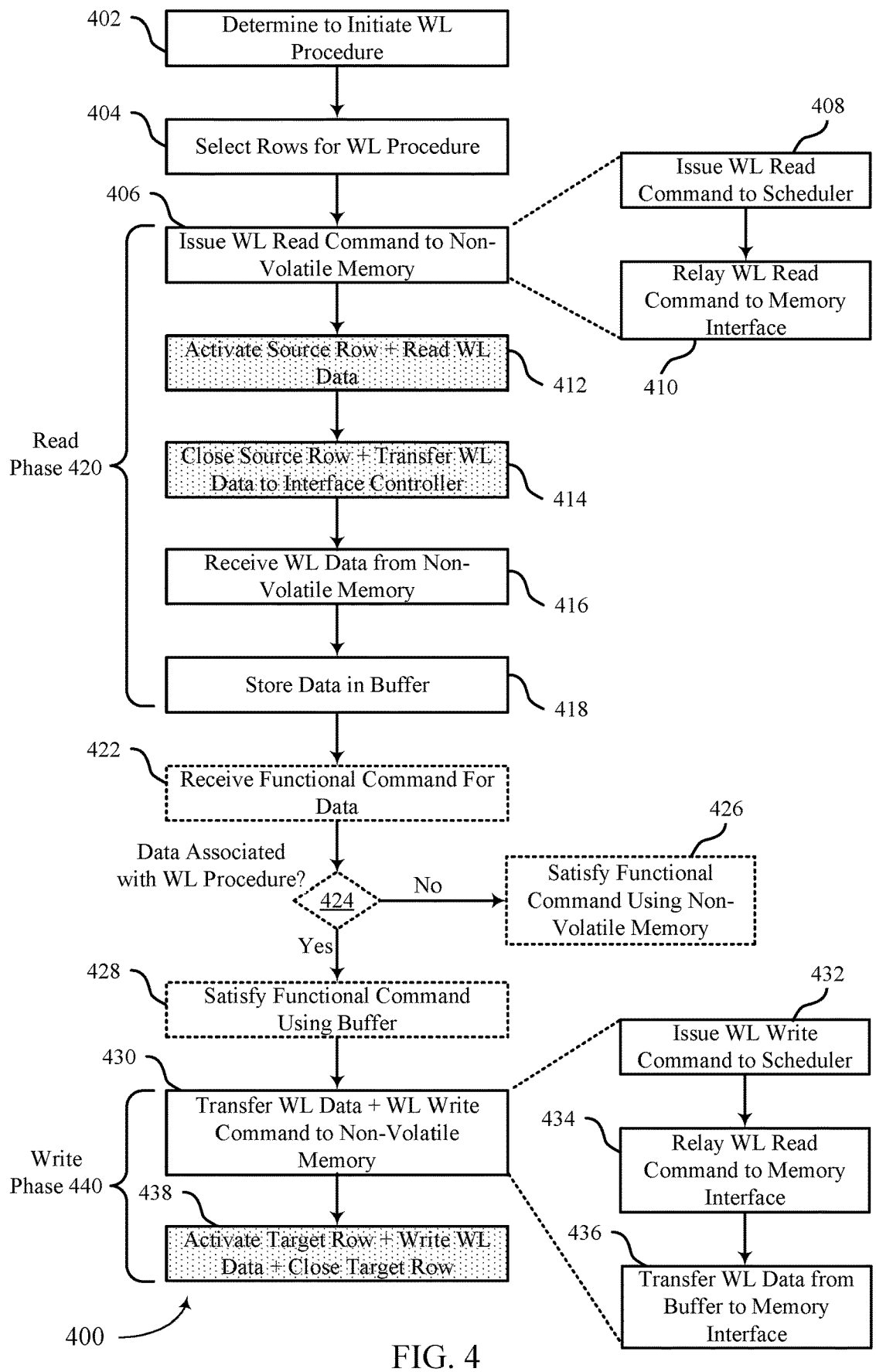
FIG. 4 illustrates an example of a process flow that supports memory wear management in accordance with examples as disclosed herein.

FIG. 4 illustrates an example of a process flow 400 that supports memory wear management in accordance with examples as disclosed herein. The process flow 400 may be an example of a process flow implemented by a device such as the memory subsystem 110 described with reference to FIG. 1, the memory subsystem 200 described with reference to FIG. 2, or the device 300 described with reference to FIG. 3. Thus, the device may include an interface controller and a non-volatile memory. The process flow 400 may illustrate operations of the interface controller and the non-volatile memory when the interface controller manages wear-leveling procedures for the non-volatile memory. Operations performed by the interface controller may be represented by white boxes and operations performed by the non-volatile memory may be represented by shaded boxes.

In some examples, aspects of the process flow 400 may be implemented by a controller, among other components. Additionally or alternatively, aspects of the process flow 400 may be implemented as instructions stored in memory (e.g., firmware stored in the volatile memory 120 and/or the non-volatile memory 125). For example, the instructions, when executed by a controller, may cause the controller to perform the operations of the process flow 400.

As described herein, the interface controller may divide a wear-leveling procedure for a memory bank into a read phase 420 and a write phase 440, which may allow the interface controller to service functional commands for the memory bank in the midst of the wear-leveling procedure (e.g., after commencement of the wear-leveling procedure but before completion of the wear-leveling procedure). Although described with reference to a single memory bank, the operations of the process flow 400 may be implemented on multiple memory banks in parallel (e.g., on a management group basis or on all memory banks in the non-volatile memory).

Alternative examples of the process flow 400 may be implemented in which some operations are performed in a different order than described or are not performed at all. In some examples, the process flow 400 may include operations not mentioned below (e.g., additional operations may be added). Additionally, some operations may be performed in parallel (e.g., concurrently, or during overlapping times).

At 402, the device may determine to initiate a wear-leveling procedure for a memory bank. For example, the wear-leveling manager 320 may determine to initiate a wear-leveling procedure for memory bank 0. The wear-leveling manager 320 may determine to initiate the wear-leveling procedure based on activity information for the memory bank 0 or based on a timer for the memory bank 0. For example, the wear-leveling manager 320 may determine to initiate the wear-leveling procedure for memory bank 0 based on the quantity of activate commands for memory bank 0 exceeding a threshold quantity. Or the wear-leveling manager 320 may determine to initiate the wear-leveling procedure for memory bank 0 based on the amount of time since the last wear-leveling procedure for memory bank 0 exceeding a threshold amount of time. For example, the wear-leveling manager 320 may determine to initiate the wear-leveling procedure for memory bank 0 periodically.

At 404, the device may select memory rows for the wear-leveling procedure. For example, the wear-leveling manager 320 may select a source row and a target row. The rows may be selected based on pointer information received from the registers 325. For example, the source row may be selected based on the source pointer for memory bank 0 and the target row may be selected based on the target pointer for memory bank 0. By managing the wear-leveling procedure at the interface controller 305, the device 300 may avoid address translation that might otherwise occur, thus saving time and/or processing resources. For example, rather than issuing a wear-leveling command with a logical row address to the non-volatile memory 310—and thus requiring the non-volatile memory 310 to perform address translation to determine the associated physical row address—the interface controller 305 may issue a wear-leveling command with the physical address, thereby obviating the need for address translation at the non-volatile memory 310. Further, the interface controller 305 may avoid address translation altogether for wear-leveling procedures by 1) receiving the source and target pointers from the registers 325 (because they indicate physical addresses directly, and therefore do not require translation) and 2) transferring physical addresses (as opposed to logical addresses) to the scheduler 340 along with wear-leveling commands. Thus, the configuration of the device 300 may allow the device 300 to avoid address translation for wear-leveling procedures.

At 406, the device may issue a wear-leveling read command to the non-volatile memory. For example, the interface controller 305 may issue a wear-leveling read command to the non-volatile memory 310. The read command may include or be accompanied by an indication of the source row (e.g., the physical address for the source row). The read command may be preceded by an activate command that is directed to the source row or a memory bank associated with the source row. In some examples, issuing the wear-leveling read command may include the wear-leveling manager 320 issuing a wear-leveling command to the scheduler 340 at 408, and the scheduler 340 relaying at 410 the wear-leveling read command to the memory interface 350 for transmission to the non-volatile memory 310 over the buses 315.

The wear-leveling commands transferred between components of the interface controller 305 may be formatted differently depending on the components involved in the transfer. Although described with reference to a wear-leveling read command, similar operations may be performed for other commands associated with wear-leveling (e.g., activate commands, wear-leveling write commands, pre-charge commands, etc.).

At 412, the non-volatile memory may activate the source row in the memory bank selected for the wear-leveling procedure. For example, the non-volatile memory 310 may activate the source row in memory bank 0. Activating a row may also be referred to as opening a row and may involve applying an activation voltage to the word line associated with the row (e.g., so the data in the row can be sensed during a read operation). The non-volatile memory may also read the data from the source row. At 414, the non-volatile memory close the source row and transfer the wear-leveling data to the device. For example, the non-volatile memory 310 may close the source row in memory bank 0 and transfer the wear-leveling data to the interface controller 305 via the buses 315 and the memory interface 350. Closing a row may also be referred to as deactivating or pre-charging a row and may involve removing an activation voltage from the word line associated with the row and/or latching data sensed from the row. Closing the row in memory bank 0 after reading the wear-leveling data may allow other rows in memory bank 0 to be opened and accessed during the wear-leveling procedure.

At 416, the device may receive the wear-leveling data from the non-volatile memory. For example, the interface controller 305 may receive the wear-leveling data from the non-volatile memory 310. At 418, the device may store the wear-leveling data in the buffer associated with the memory bank selected for the wear-leveling procedure. For example, the memory interface 350 may store the wear-leveling data for memory bank 0 in buffer 0 of the buffers 345. The operations between 406 and 418 may be part of the read phase 420 of the wear-leveling procedure. Because the source row is closed at the end of the read phase 420, the device is able to access other rows of memory bank 0 to service functional commands while the wear-leveling procedure is in progress, which may reduce latency.

In some examples, the device may, at 422, receive a functional command associated with the memory bank undergoing the wear-leveling procedure. For example, the interface controller 305 may receive for memory bank 0 a read command or a write command from a host device coupled with the interface controller 305. The read command may request data from a logical address of the non-volatile, whereas the write command may request storage of provided data at a logical address of the non-volatile memory array. The functional command may be relayed to the scheduler 340 along with a translation of the logical address (e.g., physical address associated with the logical address). The physical address may be determined by the address translator 335 based on the offset pointer stored in the registers 325, among other pointers.

In some examples, the device may, at 424, determine whether the data associated with the functional command is also associated with the wear-leveling procedure. For example, if the functional command is a read command, the scheduler 340 may determine whether the data requested by the read command is the data subject to the current wear-leveling procedure (e.g., the wear-leveling procedure in progress). The scheduler 340 may make this determination by comparing the physical address for the read command with the physical address for the wear-leveling procedure. If the physical addresses do not match, the device may satisfy the read command at 426 by retrieving the data from the non-volatile memory and returning it to the host device (e.g., via the buffer 218 as described with reference to FIG. 2). If the physical addresses match, the scheduler 340 may satisfy the read command at 428 by reading the requested data from the buffers 345 (e.g., buffer 0) and returning the requested data to the host device (e.g., via the buffer 218 as described with reference to FIG. 2).

If the functional command received at 422 is a write command, the scheduler 340 may determine whether the physical address associated with the write command is the data subject to the current wear-leveling procedure. The scheduler 340 may make this determination by comparing the physical address for the wear-leveling procedure with the physical address associated with the write command. If the physical addresses do not match, the device 300 may satisfy the write command at 426 by storing the provided data in the non-volatile memory 310. If the physical addresses match, the scheduler 340 may satisfy the write command at 428 by writing the provided data to the buffers 345 (e.g., buffer 0). Thus, the device may service and satisfy functional commands during the wear-leveling procedure.

At 430, the device may transfer a wear-leveling write command and the wear-leveling data to the non-volatile memory as part of the write phase 440 of the wear-leveling procedure. For example, the interface controller 305 may transfer the wear-leveling data and the wear-leveling write command to the non-volatile memory 310. The write command may include or be accompanied by an indication of the target row (e.g., the physical address for the target row). The write command may be preceded by an activate command that is directed to the target row or the memory bank associated with the target row. In some examples, issuing the wear-leveling write command may include the wear-leveling manager 320 issuing a wear-leveling write command to the scheduler 340 at 432, the scheduler 340 relaying at 434 the wear-leveling write command to the memory interface 350, and the memory interface 350 retrieving at 436 the wear-leveling data from the buffers 345 (e.g., buffer 0). Thus, the memory interface 350 may transmit the wear-leveling data and the wear-leveling write command to the non-volatile memory 310 over the buses 315.

At 438, the device may activate the target row of the memory bank selected for the wear-leveling procedure, write the wear-leveling data to the target row, and close the target row. For example, the non-volatile memory 310 may activate the target row in memory bank 0, write the wear-leveling data to the target row, and close the target row. Thus, the write phase 440 of the wear-leveling procedure, and the wear-leveling procedure itself, may be completed.

In some examples, the device may update the pointers in the registers 325 after completing the wear-leveling procedure for memory bank 0. For example, the wear-leveling manager 320 may update the source pointer, target pointer, and/or offset pointer to indicate new physical addresses of the non-volatile memory 310. This way, a subsequent wear-leveling procedure may involve new rows of the memory bank 0, which may increase the efficacy of the wear-leveling techniques described herein.

Although described with reference to a single memory bank, the operations of the process flow 400 may be implemented on multiple memory banks in parallel or in series. In some examples, the wear-leveling procedures performed on the other memory banks may involve the same physical row addresses for the source row and target row. In other examples, the wear-leveling procedures performed on the other memory banks may involve different physical row addresses for the source row and target row.

Figure 5:
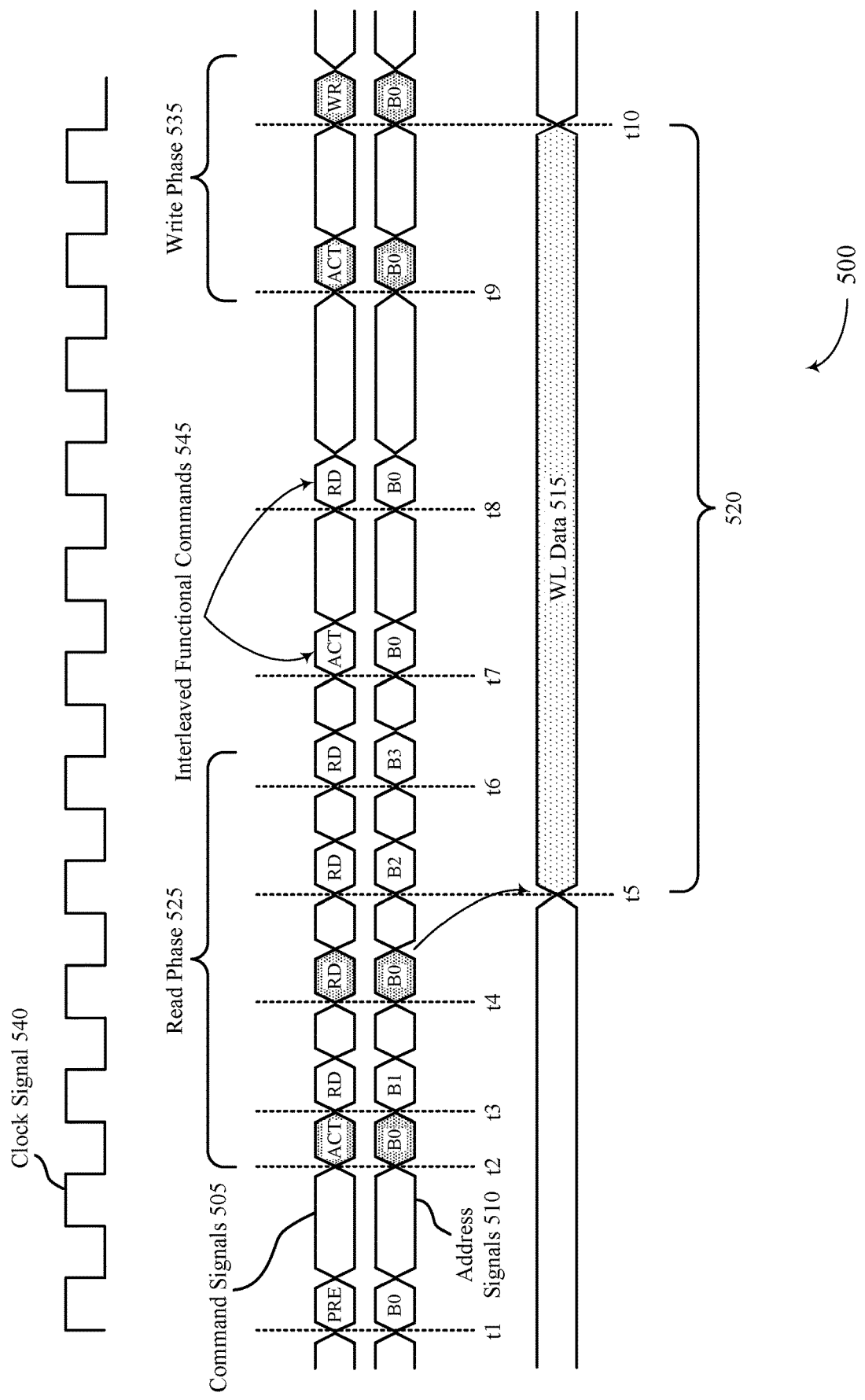
FIG. 5 illustrates an example of a timing diagram that supports memory wear management in accordance with examples as disclosed herein.

FIG. 5 illustrates an example of a timing diagram 500 that supports memory wear management in accordance with examples as disclosed herein. The timing diagram 500 may illustrate signals exchanged between an interface controller and a non-volatile memory as described herein. The signals may include command signals 505 and address signals 510, which may be transmitted over one or more C/A buses between the interface controller and the non-volatile memory. The signals demonstrate how functional commands can be serviced during a wear-leveling procedure that is managed by the interface controller as described herein. In timing diagram 500, wear-leveling commands and data may be represented by shaded shapes and functional commands may be represented by white shapes. The clock signal 540 may be used to synchronize operations at the interface controller and the non-volatile memory.

At time t1, the interface controller may transmit to the non-volatile memory a precharge command (PRE) for memory bank 0 (B0). In some examples, the precharge command may be a per-bank precharge command (PREpb). The precharge command may indicate that the non-volatile memory is to save data in the memory bank 0 and close any open rows. Thus, the memory bank 0 may be prepared for a wear-leveling procedure. At time t2, the interface controller may transmit to the non-volatile memory an activate command (ACT) for a source row in memory bank 0. The activate command may indicate that the non-volatile memory is to activate the source row for a wear-leveling procedure. Accordingly, the non-volatile memory may activate the source row. At time t3, the interface controller may transmit to the non-volatile memory a read command for memory bank 1. The non-volatile memory may service the read command for memory bank 1 (not shown).

At time t4, the interface controller may transmit to the non-volatile memory a wear-leveling read command for the source row in memory bank 0. The wear-leveling read command may indicate that the non-volatile memory is to read the data from the source row and return it to the interface controller (e.g., for storage in a buffer, such as buffer 0 in the buffers 345 as described with reference to FIG. 3). The amount of time the wear-leveling data 515 is stored in the buffer may be represented by period 520. After reading the data from the source row, the non-volatile memory may close the source row (e.g., automatically or responsive to a precharge command from the interface controller) so that other rows in memory bank 0 can be accessed for functional commands. Thus, the read phase 525 may include transmitting the activate command at time t2, transmitting the wear-leveling read command at time t4, storing the wear-leveling data in the buffer, and closing the source row in the memory bank 0. The duration of the read phase may be shorter or longer than shown but may end before the functional activate command for memory bank 0 is transmitted at time t7.

After storing the wear-leveling data in the buffer, but before it is stored in the target row, the interface controller may issue functional commands to memory bank 0 and other memory banks. For example, the interface controller may transmit to the non-volatile memory a functional read command for a row in memory bank 2 at time t5, and a functional read command for a row in memory bank 3 at time t6. The non-volatile memory may service and satisfy these functional read commands as described herein. The interface controller may also transmit to the non-volatile memory a functional activate command for a row in memory bank 0 at time t7 and a functional read command for the row in memory bank 0 at time t8. The row may be any row in memory bank 0 that is not involved in the on-going wear-leveling procedure. Accordingly, the non-volatile memory may activate the row in memory bank 0 and read the data from the row. Such behavior is possible because the source row in memory bank 0 was closed at the end of the read phase 525. After reading the data from the row, the non-volatile memory may close the row so that other rows in memory bank 0 can be accessed for functional or wear-leveling commands.

At time t9, the interface controller may transmit to the non-volatile memory a wear-leveling activate command for the target row in memory bank 0. In response to the activate command the non-volatile memory may activate the target row in memory bank 0. At time t10, the interface controller may transmit to the non-volatile memory a wear-leveling write command for the target row in memory bank 0. In response to the wear-leveling write command, the non-volatile memory may write the wear-leveling data to the target row, thus completing the write phase 535 of the wear-leveling procedure, which concludes the wear-leveling procedure. After writing the wear-leveling data to the target row, the non-volatile memory may close the target row (e.g., automatically or responsive to a precharge command from the interface controller) so that other rows in memory bank 0 can be accessed for subsequent commands.

Thus, the memory interface may issue interleaved functional commands 545 for a memory bank undergoing a wear-leveling procedure by separating the read phase 525 and the write phase 535 of the wear-leveling procedure.

Figure 6:
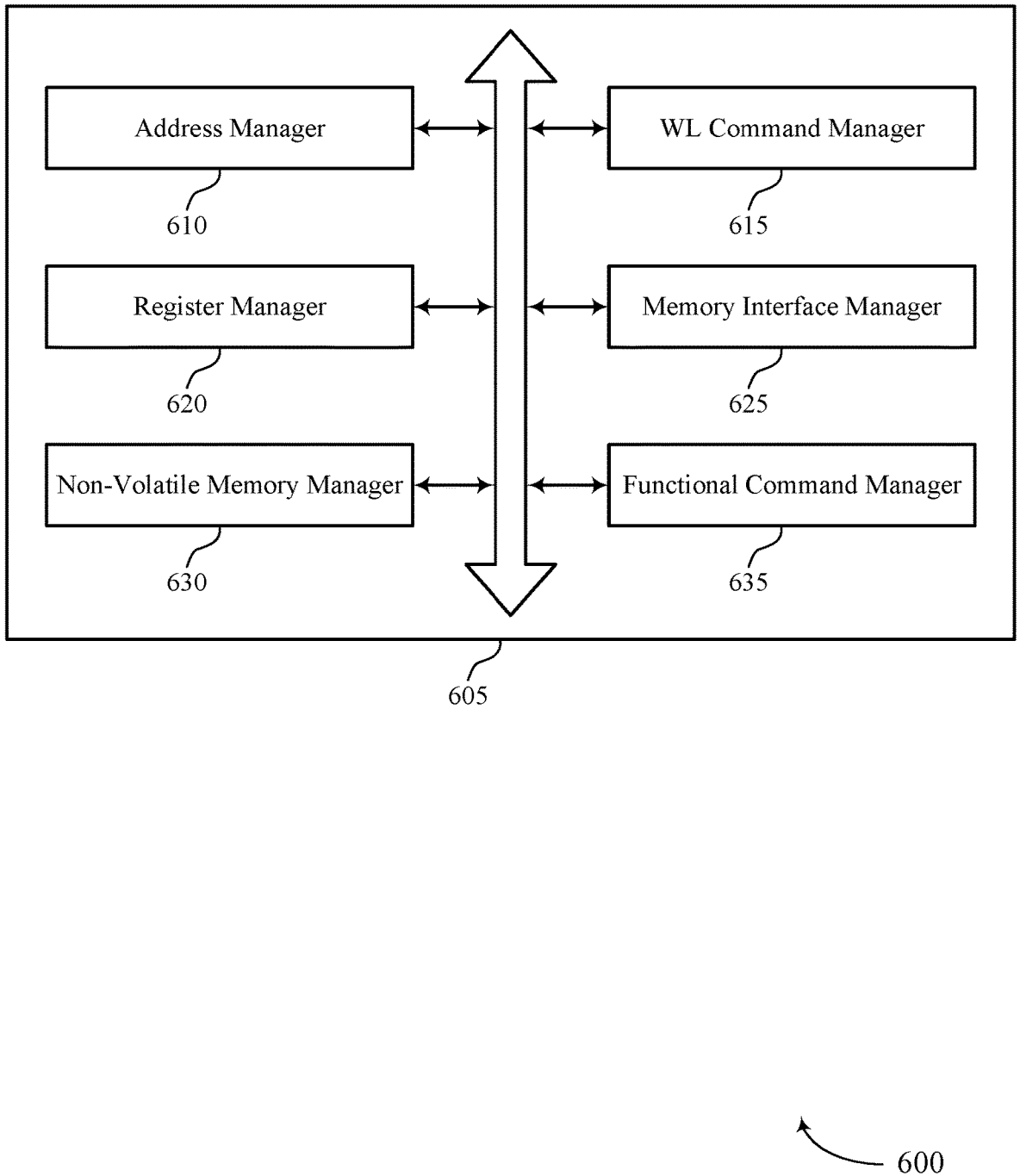
FIG. 6 shows a block diagram of a device that supports memory wear management in accordance with aspects of the present disclosure.

FIG. 6 shows a block diagram 600 of a device 605 that supports memory wear management in accordance with examples as disclosed herein. The device 605 may be an example of aspects of a memory subsystem 110, a memory subsystem 200, or a device 300 as described with reference to FIGS. 1, 2, and 3, respectively. Thus, the device may include a non-volatile memory that includes one or more memory banks and an interface controller coupled with the non-volatile memory. The device 605 may include an address manager 610, a wear-leveling (WL) command manager 615, a register manager 620, a memory interface manager 625, a non-volatile memory manager 630, and a functional command manager 635. Each of these modules may include circuitry configured to perform the functions described herein. Each of these modules may communicate, directly or indirectly, with one another (e.g., via one or more buses or other conductive connections).

In a first example, the address manager 610 may select a physical row address in the memory bank for a procedure that moves data from a first row of the memory bank to a second row of the memory bank. The procedure may be a wear-leveling procedure as described herein. The WL command manager 615 may determine to initiate the procedure for the first row of the memory bank based at least in part on the physical row address, wherein the physical row address is associated with the first row. The WL command manager 615 may also issue, to the non-volatile memory as part of the procedure, a read command for the physical row address associated with the first row.

In some examples, the register manager 620 may transfer the data to a register in the interface controller based at least in part on issuing the read command. In some examples, the memory interface manager 625 may transfer the data from the register to the non-volatile memory. In some examples, the non-volatile memory manager 630 may store the data in the second row of the memory bank. In some examples, the memory interface manager 625 may transfer second data to or from the memory bank between transferring the data to the register and transferring the data to the non-volatile memory.

In some examples, the functional command manager 635 may receive, from a host device, a read command for a logical row address. In some examples, the functional command manager 635 may determine that the logical row address is associated with the first row based at least in part on a pointer stored in a register of the interface controller. In some examples, the register manager 620 may return the data from the register to the host device based at least in part on the logical row address being associated with the first row.

In some examples, the functional command manager 635 may receive, from a host device, a write command for a logical row address, the write command associated with second data. In some examples, the functional command manager 635 may determine that the logical row address is associated with the first row based at least in part on a pointer stored in a register of the interface controller. In some examples, the register manager 620 may replace the data in the register with the second data based at least in part on receiving the write command for the logical row address.

In some examples, the WL command manager 615 may issue, to the non-volatile memory and based at least in part on issuing the read command, a write command for a second physical row address associated with the second row of the memory bank. In some examples, the functional command manager 635 may issue, to the non-volatile memory and between issuing the read command and the write command, an access command associated with the memory bank. In some examples, the functional command manager 635 may issue, to the non-volatile memory and between issuing the read command and the write command, an access command associated with the memory bank.

In some examples, the physical row address is selected based at least in part on a pointer stored in a register of the interface controller. In some examples, the register manager 620 may select a second physical row address associated with the second row based at least in part on a second pointer stored in the register.

In some examples, the non-volatile memory manager 630 may store the data in the second row of the memory bank based after issuing the read command. In some examples, the register manager 620 may update one or more pointers in a register of the interface controller based at least in part on storing the data in the second row of the memory bank.

In some examples, the non-volatile memory includes a second memory bank. In some examples, the address manager 610 may select a second physical row address in the second memory bank for a second procedure that moves second data between rows of the second memory bank, wherein the procedure and the second procedure overlap at least partially in time.

In a second example, the address manager 610 may determine a first physical row address for a first row, of the memory bank, that stores data to be transferred to a second row of the memory bank. The WL command manager 615 may transfer, to the non-volatile memory, a read command for the first physical row address. The register manager 620 may transfer the data to a register in the interface controller based at least in part on transmitting the read command. And the memory interface manager 625 may transfer the data from the register to the non-volatile memory.

In some examples, the WL command manager 615 may transfer a write command to the non-volatile memory, where the data is stored in the second row of the memory bank based at least in part on the write command.

In some examples, the memory interface manager 625 may transfer second data to or from the memory bank after transferring the data to the register and before transferring the data to the non-volatile memory.

In some examples, the WL command manager 615 may initiate a wear-leveling procedure for the memory bank, where the wear-leveling procedure comprises moving the data from the first row to the second row of the memory bank. In some examples, the WL command manager 615 may determine that a threshold duration has expired since a previous wear-leveling procedure was completed, where the wear-leveling procedure is initiated based at least in part on determining that the threshold duration has expired. In some examples, the WL command manager 615 may determine that a threshold quantity of activate commands have been directed to the memory bank since a previous wear-leveling procedure was completed, where the wear-leveling procedure is initiated based at least in part on determining that the threshold quantity of activate commands have been directed to the memory bank.

Figure 7:
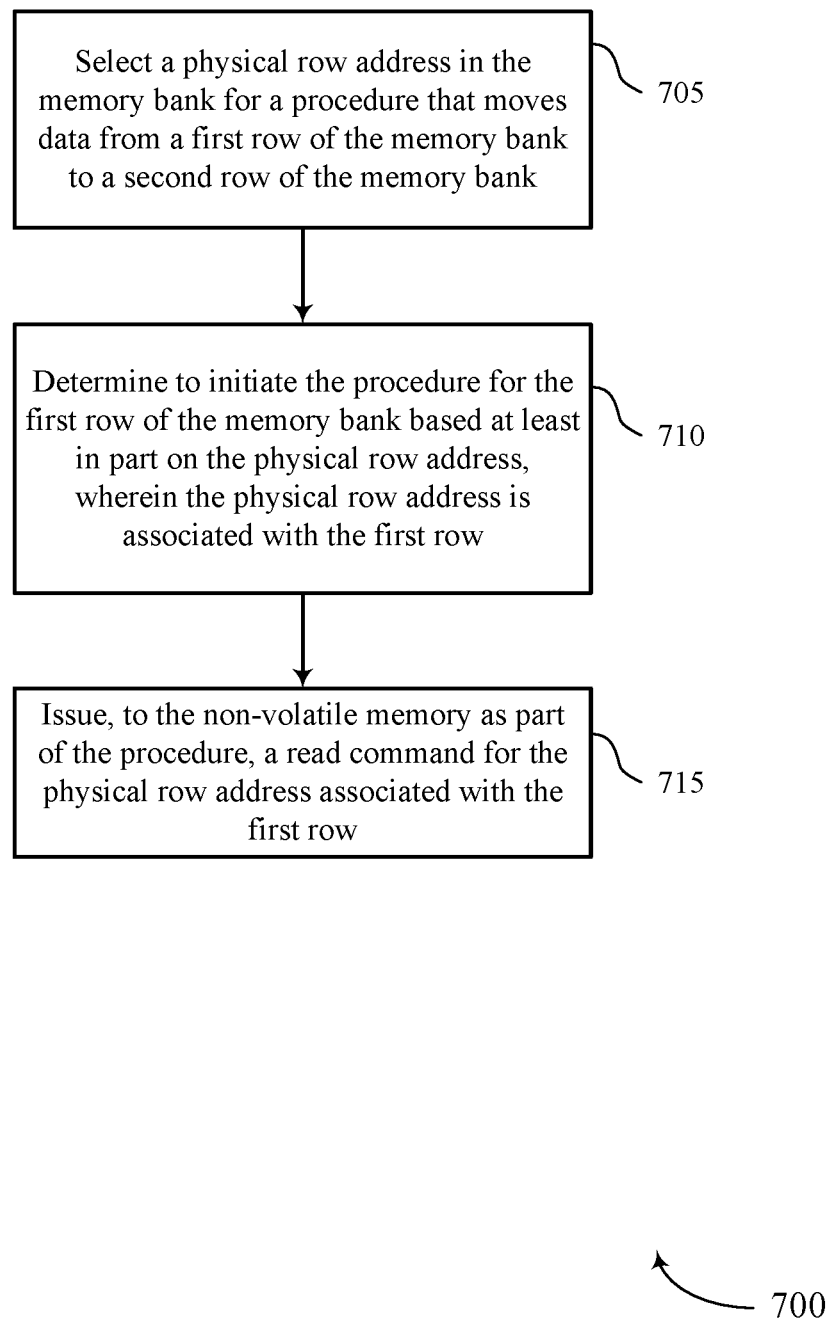
FIGS. 7 and 8 show flowcharts illustrating a method or methods that support memory wear management in accordance with examples as disclosed herein.

FIG. 7 shows a flowchart illustrating a method or methods 700 that supports memory wear management in accordance with aspects of the present disclosure. The operations of method 700 may be implemented by a memory subsystem or its components as described herein. For example, the operations of method 700 may be performed by a memory subsystem as described with reference to FIGS. 1 through 6. In some examples, a memory subsystem may execute a set of instructions to control the functional elements of the memory subsystem to perform the described functions. Additionally or alternatively, a memory subsystem may perform aspects of the described functions using special-purpose hardware.

In some examples, the operations of method 700 may be implemented by an apparatus that includes a non-volatile memory and an interface controller. The non-volatile memory may include one or more memory banks and may be coupled with the interface controller.

At 705, the method may include selecting a physical row address in the memory bank for a procedure that moves data from a first row of the memory bank to a second row of the memory bank. The operations of 705 may be performed according to the methods described herein. In some examples, aspects of the operations of 705 may be performed by an address manager as described with reference to FIG. 6.

At 710, the method may include determining to initiate the procedure for the first row of the memory bank based at least in part on the physical row address, wherein the physical row address is associated with the first row. The operations of 710 may be performed according to the methods described herein. In some examples, aspects of the operations of 710 may be performed by an address manager as described with reference to FIG. 6.

At 715, the method may include issuing, to the non-volatile memory as part of the procedure, a read command for the physical row address associated with the first row. The operations of 715 may be performed according to the methods described herein. In some examples, aspects of the operations of 715 may be performed by a WL command manager as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for selecting a logical row address in the memory bank for a procedure that moves data from a first row of the memory bank to a second row of the memory bank; determining a physical row address associated with the first row of the memory bank based at least in part on the logical row address and one or more pointers stored in a register of the interface controller; and issuing, to the non-volatile memory as part of the procedure, a read command for the physical row address.

Some examples of the method 700 and the apparatus described herein may further include operations, features, means, or instructions for transferring the data to a register in the interface controller based at least in part on issuing the read command. Some examples of the method 700 and the apparatus described herein may further include operations, features, means, or instructions for transferring the data from the register to the non-volatile memory; and storing the data in the second row of the memory bank. Some examples of the method 700 and the apparatus described herein may further include operations, features, means, or instructions for transferring second data to or from the memory bank between transferring the data to the register and transferring the data to the non-volatile memory.

Some examples of the method 700 and the apparatus described herein may further include operations, features, means, or instructions for transferring the data to a register in the interface controller based at least in part on issuing the read command. Some examples of the method 700 and the apparatus described herein may further include operations, features, means, or instructions for receiving, from a host device, a read command for a logical row address; determining that the logical row address is associated with the first row based at least in part on a pointer stored in a register of the interface controller; and returning the data from the register to the host device based at least in part on the logical row address being associated with the first row.

Some examples of the method 700 and the apparatus described herein may further include operations, features, means, or instructions for transferring the data to a register in the interface controller based at least in part on issuing the read command. Some examples of the method 700 and the apparatus described herein may further include operations, features, means, or instructions for receiving, from a host device, a write command for a logical row address, the write command associated with second data. Some examples of the method 700 and the apparatus described herein may further include operations, features, means, or instructions for determining that the logical row address is associated with the first row based at least in part on a pointer stored in a register of the interface controller. Some examples of the method 700 and the apparatus described herein may further include operations, features, means, or instructions for replacing the data in the register with the second data based at least in part on receiving the write command for the logical row address.

Some examples of the method 700 and the apparatus described herein may further include operations, features, means, or instructions for issuing, to the non-volatile memory and based at least in part on issuing the read command, a write command for a second physical row address associated with the second row of the memory bank. Some examples of the method 700 and the apparatus described herein may further include operations, features, means, or instructions for issuing, to the non-volatile memory and between issuing the read command and the write command, an access command associated with the memory bank.

In some examples, the physical row address is selected based at least in part on a pointer stored in a register of the interface controller. Some examples of the method 700 and the apparatus described herein may further include operations, features, means, or instructions for selecting a second physical row address associated with the second row based at least in part on a second pointer stored in the register.

Some examples of the method 700 and the apparatus described herein may further include operations, features, means, or instructions for storing the data in the second row of the memory bank based after issuing the read command. Some examples of the method 700 and the apparatus described herein may further include operations, features, means, or instructions for updating one or more pointers in a register of the interface controller based at least in part on storing the data in the second row of the memory bank.

Some examples of the method 700 and the apparatus described herein may further include operations, features, means, or instructions for selecting a second physical row address in a second memory bank (of the non-volatile memory) for a second procedure that moves second data between rows of the second memory bank, where the procedure and the second procedure overlap at least partially in time.

Figure 8:
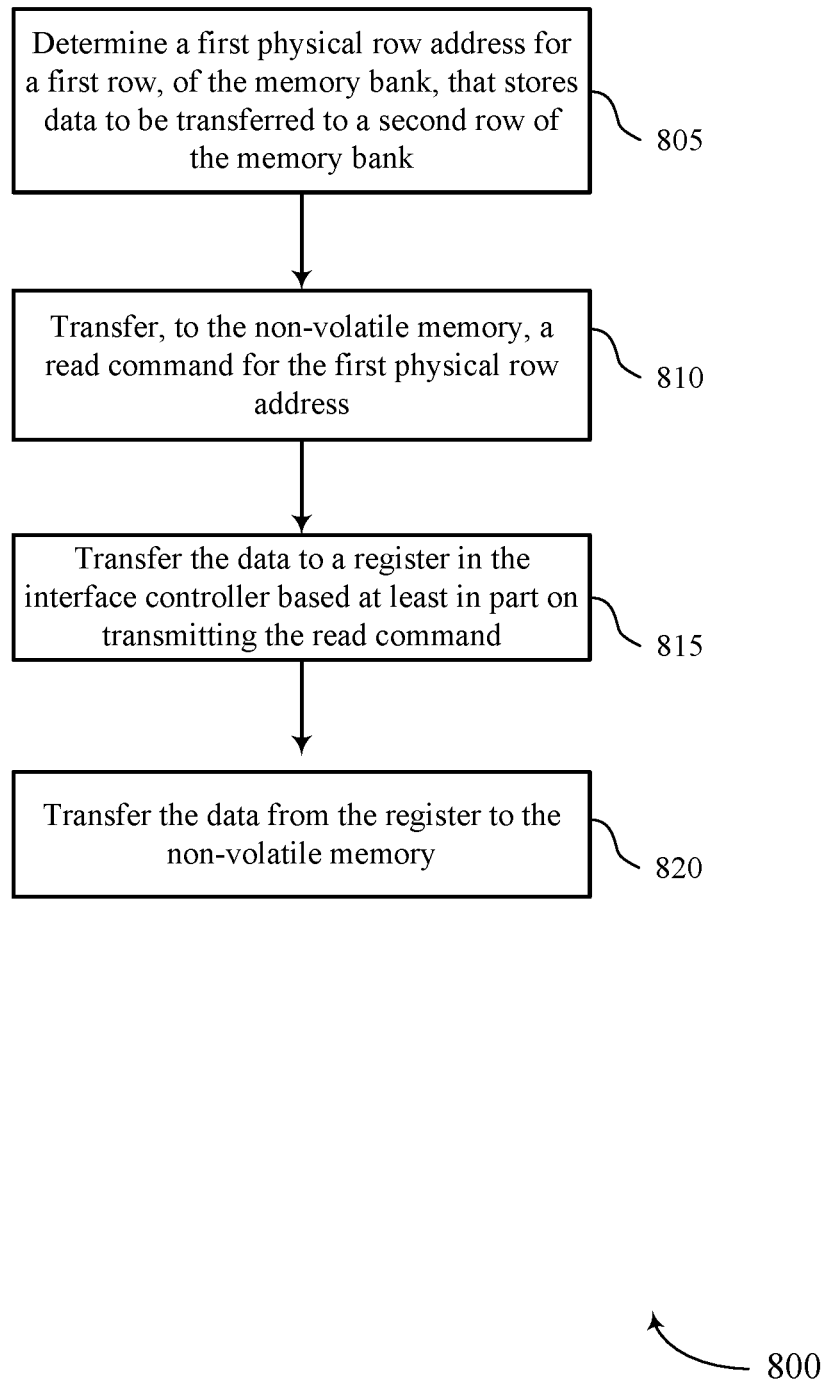

FIG. 8 shows a flowchart illustrating a method or methods 800 that supports memory wear management in accordance with aspects of the present disclosure. The operations of method 800 may be implemented by a memory subsystem or its components as described herein. For example, the operations of method 800 may be performed by a memory subsystem as described with reference to FIGS. 1 through 6. In some examples, a memory subsystem may execute a set of instructions to control the functional elements of the memory subsystem to perform the described functions. Additionally or alternatively, a memory subsystem may perform aspects of the described functions using special-purpose hardware.

In some examples, the operations of method 800 may be implemented by an apparatus that includes a non-volatile memory and an interface controller. The non-volatile memory may include one or more memory banks and may be coupled with the interface controller.

At 805, the method may include determining a first physical row address for a first row, of the memory bank, that stores data to be transferred to a second row of the memory bank. The operations of 805 may be performed according to the methods described herein. In some examples, aspects of the operations of 805 may be performed by an address manager as described with reference to FIG. 6.

At 810, the method may include transferring, to the non-volatile memory, a read command for the first physical row address. The operations of 810 may be performed according to the methods described herein. In some examples, aspects of the operations of 810 may be performed by a WL command manager as described with reference to FIG. 6.

At 815, the method may include transferring the data to a register in the interface controller based at least in part on transmitting the read command. The operations of 815 may be performed according to the methods described herein. In some examples, aspects of the operations of 815 may be performed by a register manager as described with reference to FIG. 6.

At 820, the method may include transferring the data from the register to the non-volatile memory. The operations of 820 may be performed according to the methods described herein. In some examples, aspects of the operations of 820 may be performed by a memory interface manager as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for determining a first physical row address for a first row, of the memory bank, that stores data to be transferred to a second row of the memory bank; transferring, to the non-volatile memory, a read command for the first physical row address; transferring the data to a register in the interface controller based at least in part on transmitting the read command; and transferring the data from the register to the non-volatile memory.

In some examples of the method 800 and the apparatus described herein, determining the storage information may include operations, features, means, or instructions for transferring a write command to the non-volatile memory, where the data is stored in the second row of the memory bank based at least in part on the write command.

In some examples of the method 800 and the apparatus described herein, determining the storage information may include operations, features, means, or instructions for transferring second data to or from the memory bank after transferring the data to the register and before transferring the data to the non-volatile memory.

In some examples of the method 800 and the apparatus described herein, determining the storage information may include operations, features, means, or instructions for initiating a wear-leveling procedure for the memory bank, where the wear-leveling procedure comprises moving the data from the first row to the second row of the memory bank. In some examples of the method 800 and the apparatus described herein, determining the storage information may include operations, features, means, or instructions for determining that a threshold duration has expired since a previous wear-leveling procedure was completed, where the wear-leveling procedure is initiated based at least in part on determining that the threshold duration has expired. In some examples of the method 800 and the apparatus described herein, determining the storage information may include operations, features, means, or instructions for determining that a threshold quantity of activate commands have been directed to the memory bank since a previous wear-leveling procedure was completed, where the wear-leveling procedure is initiated based at least in part on determining that the threshold quantity of activate commands have been directed to the memory bank.

In some examples, an apparatus as described herein may perform aspects of method 700 and method 800. The apparatus may include a non-volatile memory comprising a plurality of memory banks and an interface controller coupled with the non-volatile memory. The interface controller may include a first logic component (e.g., the wear-leveling manager 320) configured to manage procedures that move data between rows of a memory bank in the non-volatile memory; a register (e.g., one of the registers 325) coupled with the first logic component and configured to store one or more pointers associated with the rows of the memory bank; and a second logic component (e.g., the address translator 335) coupled with the register and configured to determine a physical row address based at least in part on the one or more pointers stored in the register. The one or more pointers may be associated with a single memory bank of the plurality of memory banks. Or the one or more pointers may be associated with a subset of the plurality of memory banks.

In some examples, the interface controller includes a buffer (e.g., one of the buffers 345) configured to store data that is from one row of the memory bank and that is intended for another row of the memory bank indicated by the one or more pointers.

In some examples, the interface controller includes a second register (e.g., one or the registers 355) coupled with the first logic component and operable to maintain a counter for a memory bank of the plurality of memory banks, where a counter for the memory bank indicates a quantity of activate commands received for the memory bank.

In some examples, the interface controller includes a third logic component (e.g., the memory interface 350) coupled with the second logic component and configured to transmit to the non-volatile memory access commands for physical rows indicated by the one or more pointers. In some examples, the interface controller includes a fourth logic component (e.g., the scheduler 340) coupled with the third logic component and configured to schedule the access commands transmitted by the third logic component.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a non-volatile memory comprising a memory bank; and
an interface controller coupled with the non-volatile memory and operable to cause the apparatus to:
select a physical row address in the memory bank for a procedure that moves data from a first row of the memory bank to a second row of the memory bank;
determine to initiate the procedure for the first row of the memory bank based at least in part on the physical row address, wherein the physical row address is associated with the first row;
issue, to the non-volatile memory as part of the procedure, a read command for the physical row address associated with the first row;
store the data in the second row of the memory bank based at least in part on issuing the read command; and
update one or more pointers in a register of the interface controller based at least in part on storing the data in the second row of the memory bank.

2. The apparatus of claim 1, wherein the procedure comprises a wear-leveling procedure.

3. The apparatus of claim 1, wherein the interface controller is operable to cause the apparatus to:
transfer the data to the register of the interface controller based at least in part on issuing the read command.

4. The apparatus of claim 3, wherein the interface controller is operable to cause the apparatus to:
transfer the data from the register to the non-volatile memory; and
store the data in the second row of the memory bank.

5. The apparatus of claim 4,
wherein the interface controller is operable to cause the apparatus to:
transfer second data to or from the memory bank between transferring the data to the register and transferring the data to the non-volatile memory.

6. The apparatus of claim 1, wherein the physical row address is selected based at least in part on a pointer stored in the register of the interface controller, and wherein the interface controller is operable to cause the apparatus to:
select a second physical row address associated with the second row based at least in part on a second pointer stored in the register.

7. The apparatus of claim 1, wherein the interface controller is operable to cause the apparatus to:
issue, to the non-volatile memory and based at least in part on issuing the read command, a write command for a second physical row address associated with the second row of the memory bank.

8. The apparatus of claim 7, wherein the interface controller is operable to cause the apparatus to:
issue, to the non-volatile memory and between issuing the read command and the write command, an access command associated with the memory bank.

9. An apparatus, comprising:
a non-volatile memory comprising a memory bank; and
an interface controller coupled with the non-volatile memory and operable to cause the apparatus to:
select a physical row address in the memory bank for a procedure that moves data from a first row of the memory bank to a second row of the memory bank;
determine to initiate the procedure for the first row of the memory bank based at least in part on the physical row address, wherein the physical row address is associated with the first row;
issue, to the non-volatile memory as part of the procedure, a read command for the physical row address associated with the first row;
transfer the data to a register in the interface controller based at least in part on issuing the read command;
receive, from a host device, a second read command for a logical row address;
determine that the logical row address is associated with the first row based at least in part on a pointer stored in a second register of the interface controller; and
return the data from the register to the host device based at least in part on the logical row address being associated with the first row.

10. An apparatus, comprising:
a non-volatile memory comprising a memory bank; and
an interface controller coupled with the non-volatile memory and operable to cause the apparatus to:
select a physical row address in the memory bank for a procedure that moves data from a first row of the memory bank to a second row of the memory bank;
determine to initiate the procedure for the first row of the memory bank based at least in part on the physical row address, wherein the physical row address is associated with the first row;
issue, to the non-volatile memory as part of the procedure, a read command for the physical row address associated with the first row;
transfer the data to a register in the interface controller based at least in part on issuing the read command;
receive, from a host device, a write command for a logical row address, the write command associated with second data;
determine that the logical row address is associated with the first row based at least in part on a pointer stored in a second register of the interface controller; and
replace the data in the register with the second data based at least in part on receiving the write command for the logical row address.

11. An apparatus, comprising:
a non-volatile memory comprising a memory bank and a second memory bank; and
an interface controller coupled with the non-volatile memory and operable to cause the apparatus to:
select a physical row address in the memory bank for a procedure that moves data from a first row of the memory bank to a second row of the memory bank;
determine to initiate the procedure for the first row of the memory bank based at least in part on the physical row address, wherein the physical row address is associated with the first row;
issue, to the non-volatile memory as part of the procedure, a read command for the physical row address associated with the first row; and
select a second physical row address in the second memory bank for a second procedure that moves second data between rows of the second memory bank, wherein the procedure and the second procedure overlap at least partially in time.

12. An apparatus, comprising:
a non-volatile memory comprising a plurality of memory banks; and
an interface controller coupled with the non-volatile memory, the interface controller comprising:
   a first logic component configured to manage procedures that move data between rows of a memory bank in the non-volatile memory;
   a register coupled with the first logic component and configured to store one or more pointers associated with the rows of the memory bank; and
   a second logic component coupled with the register and configured to translate a logical address received from a host system into a physical row address based at least in part on the one or more pointers stored in the register and configured to transfer the physical row address to a third logic component that schedules access commands for issuance to the non-volatile memory.

13. The apparatus of claim 12, wherein the interface controller further comprises:
a buffer configured to store data that is from one row of the memory bank and that is intended for another row of the memory bank indicated by the one or more pointers.

14. The apparatus of claim 13, wherein the interface controller further comprises:
a fourth logic component coupled with the third logic component and configured to transmit the access commands scheduled by the third logic component to the non-volatile memory.

15. The apparatus of claim 12, wherein the interface controller further comprises:
a second register coupled with the first logic component and operable to maintain a counter for the memory bank of the plurality of memory banks, wherein the counter for the memory bank indicates a quantity of activate commands received for the memory bank.

16. The apparatus of claim 12, wherein the one or more pointers are associated with a single memory bank of the plurality of memory banks.

17. The apparatus of claim 12, wherein the one or more pointers are associated with a subset of the plurality of memory banks.

18. An apparatus, comprising:
a non-volatile memory comprising a memory bank; and
an interface controller coupled with the non-volatile memory and operable to cause the apparatus to:
   determine a first physical row address for a first row, of the memory bank, that stores data to be transferred to a second row of the memory bank;
   transfer, to the non-volatile memory, a read command for the first physical row address;
   transfer the data to a register in the interface controller based at least in part on transmitting the read command;
   transfer the data from the register to the non-volatile memory;
   store the data in the second row of the memory bank based at least in part transferring the data to the non-volatile memory; and
   update one or more pointers in a second register of the interface controller based at least in part on storing the data in the second row of the memory bank.

19. The apparatus of claim 18, wherein the interface controller is operable to cause the apparatus to:
transfer a write command to the non-volatile memory, wherein the data is stored in the second row of the memory bank based at least in part on the write command.

20. The apparatus of claim 18, wherein the interface controller is operable to cause the apparatus to:
initiate a wear-leveling procedure for the memory bank, wherein the wear-leveling procedure comprises moving the data from the first row to the second row of the memory bank.

21. The apparatus of claim 20, wherein the interface controller is operable to cause the apparatus to:
determine that a threshold duration has expired since a previous wear-leveling procedure was completed, wherein the wear-leveling procedure is initiated based at least in part on determining that the threshold duration has expired.

22. The apparatus of claim 20, wherein the interface controller is operable to cause the apparatus to:
determine that a threshold quantity of activate commands have been directed to the memory bank since a previous wear-leveling procedure was completed, wherein the wear-leveling procedure is initiated based at least in part on determining that the threshold quantity of activate commands have been directed to the memory bank.

23. The apparatus of claim 18, wherein the interface controller is operable to cause the apparatus to:
transfer second data to or from the memory bank after transferring the data to the register and before transferring the data to the non-volatile memory.

* * * * *